(12) United States Patent
Mathes et al.

(10) Patent No.: US 6,488,903 B2
(45) Date of Patent: Dec. 3, 2002

(54) METHOD FOR CLEANING DIESEL ENGINE EXHAUST GAS

(75) Inventors: Wieland Mathes, Michelau (DE); Ronald Neufert, Michelau (DE); Dietmar Weisensel, Sinzing (DE); Klaus Wenzlawski, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 163 days.

(21) Appl. No.: 09/725,340

(22) Filed: Nov. 29, 2000

(65) Prior Publication Data

US 2001/0004452 A1 Jun. 21, 2001

Related U.S. Application Data

(63) Continuation of application No. PCT/DE99/01504, filed on May 19, 1999.

(30) Foreign Application Priority Data

May 29, 1998 (DE) .......................... 198 24 206

(51) Int. Cl.⁷ .......................... C01G 30/00; B01J 8/00; B01J 21/08; B01J 21/12; C01B 21/00
(52) U.S. Cl. ................. 423/213.2; 423/239.1; 502/242
(58) Field of Search ............... 423/213.2, 235, 423/239.1; 502/204, 232, 240, 242, 246–248, 250, 305, 308, 309, 312, 321, 322, 340, 341, 353–355

(56) References Cited

U.S. PATENT DOCUMENTS

| 4,221,768 | A | * | 9/1980 | Inoue et al. ................. 423/239 |
| 5,215,953 | A | * | 6/1993 | Blumrich et al. ........... 502/218 |
| 5,300,472 | A | * | 4/1994 | Brand et al. ................. 502/309 |
| 5,427,601 | A | * | 6/1995 | Harada et al. ................. 75/235 |
| 5,658,546 | A |   | 8/1997 | Kobayashi et al. ...... 423/239.1 |
| 6,153,161 | A | * | 11/2000 | Fetzer et al. ............. 423/239.1 |

FOREIGN PATENT DOCUMENTS

| DE | 4321555 C1 | 9/1994 | |
| EP | 0341832 A2 | 11/1989 | |
| EP | 0585795 A2 | 3/1994 | |
| EP | 0827778 A2 | 3/1998 | |
| JP | 04004045 A | * 1/1992 | ........... B01D/53/36 |
| JP | 04016239 A | * 1/1992 | ........... B01D/53/36 |

OTHER PUBLICATIONS

Japanese Patent Abstract No. 63143941 (Akira), dated Jun. 16, 1988.

* cited by examiner

Primary Examiner—Wayne A. Langel
Assistant Examiner—Jonas N. Strickland
(74) Attorney, Agent, or Firm—Laurence A. Greenberg; Werner H. Stemer; Gregory L. Mayback

(57) ABSTRACT

A method for cleaning diesel engine exhaust gas is described. The exhaust gas is passed over a catalytic converter with an active material which contains (% by weight) 70–95% $TiO_2$, 2–10% $WO_3$ and/or $MoO_3$, 0.1–5% $V_2O_5$, 0.1–8% CaO, 0.1–8% $Al_2O_3$, 0.1–5% $B_2O_3$ and 0.1–10% $SiO_2$. A reducing agent for a reduction of nitrogen oxides is metered into the exhaust-gas stream upstream of the catalytic converter.

6 Claims, No Drawings

METHOD FOR CLEANING DIESEL ENGINE EXHAUST GAS

CROSS-REFERENCE TO RELATED APPLICATION

This is a continuation of copending International Application PCT/DE99/01504, filed May 19, 1999, which designated the United States.

BACKGROUND OF THE INVENTION

Field of the Invention

The invention relates to a method for cleaning diesel engine exhaust gas. It is known that the combustion of diesel fuel leads to the formation of a large number of different pollutants and hydrocarbon-enriched soot particles (referred to below as particles for short), which are removed or at least reduced by suitable catalytic converters with active materials which have a specific action and with separate particle filters. Furthermore, if SCR catalytic converters are used, a device that can be used to meter a reducing agent into the exhaust-gas stream is required. For example, Published, European Patent Application EP 0 341 832 A2 describes a method for cleaning diesel engine exhaust gases in which a device with a platinum-containing catalytic converter is combined with a device for filtering out particles. Furthermore, adsorbers that adsorb pollutants in the lower temperature range and desorb them again at elevated temperatures are frequently used.

SUMMARY OF THE INVENTION

It is accordingly an object of the invention to provide a method for cleaning diesel engine exhaust gas that overcomes the above-mentioned disadvantages of the prior art methods of this general type, which is simplified in terms of the outlay on equipment.

With the foregoing and other objects in view there is provided, in accordance with the invention, a method for cleaning diesel engine exhaust gas. The method includes the steps of metering a reducing agent suitable for reducing nitrogen oxides into an exhaust-gas stream upstream of a catalytic converter; and passing the exhaust gas through the catalytic converter having an active material composed (in % by weight) of:

| | |
|---|---|
| 70–95% | $TiO_2$, |
| 2–10% | at least one of $WO_3$ and $MoO_3$, |
| 0.1–5% | $V_2O_5$, |
| 0.1–8% | CaO, |
| 0.1–8% | $Al_2O_3$, |
| 0.1–5% | $B_2O_3$, and |
| 0.1–10% | $SiO_2$. |

In accordance with an added feature of the invention, the active material has a BET surface area of 40–150 $m^2/g$.

In accordance with an additional feature of the invention, the active material has a pore volume measured using a Hg penetration method of 200–600 $mm^3/g$.

In accordance with another feature of the invention, the active material has a monomodal pore radius distribution, a frequency maxima of a pore radii lying in a range of 5–10,000 nm.

In accordance with a further feature of the invention, there is the step of using $TiO_2$ in its anatase modification.

In accordance with a concomitant feature of the invention, the active material has a polymodal pore radius distribution, a frequency maxima of a pore radii lying in a range of 5–10,000 nm.

Other features which are considered as characteristic for the invention are set forth in the appended claims.

Although the invention is described herein as embodied in a method for cleaning diesel engine exhaust gas, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DESCRIPTION OF THE PREFERRED EMBODIMENT

Surprisingly, it has been found that if an active material which contains (in % by weight) 70–95% $TiO_2$, 2–106 $WO_3$ and/or $MoO_3$, 0.1–5% $V_2O_5$, 0.1–8% CaO, 0.1–8% $Al_2O_3$, 0.1–5% $B_2O_3$ and 0.1–10% $SiO_2$ is used, the levels of nitrogen oxides, hydrocarbons and particles can be reduced simultaneously. As a result, a single-stage catalytic process is available, in which there is no need for a separate particle filter system or primary-side measures for reducing the levels of particles.

The advantages of a method of this type in terms of the outlay on equipment and in terms of the installation space required are obvious. The cleaning method proposed operates in the customary way. For example, to reduce the nitrogen oxides using a selective catalytic reduction (SCR) process, a nitrogen-containing reducing agent is injected into the exhaust-gas stream upstream of the catalytic converter according to the invention. The amount of reducing agent required is determined in the usual way from the engine and engine exhaust-gas data by characteristic diagram control or sensor control. Conventional $NO_x$, $NH_3$, HC, CO, $O_2$, temperature or other sensors are used for this purpose. It is preferable to use a catalytic converter whose active material has a BET surface area of 40–150 $m^2/g$ (BET method, see S. Brunaurer, P. H. Emmett, and E. Teller, JACS Vol. 60, 309 (1938)). A pore volume—measured using the Hg penetration method—is preferably 200–600 $mm^3/g$. The monomodal or polymodal pore radius distribution is selected in such a way that the frequency maxima of the pore radii lie in the range of 5–10,000 nm. The $TiO_2$ modification used is preferably the anatase modification.

To produce a catalytic converter that can be used for the method according to the invention, $TiO_2$ is mixed with the other oxides or their precursor compounds, which can be converted into the oxides by calcining at 200–800° C., and the mixture is homogenized. A mixture of this type is activated by milling or kneading and is processed into unsupported catalysts using standard ceramic processes or is used to coat inert support bodies using conventional methods. In both cases, the method is completed by drying at between room temperature and 100° C. and calcining at 200–800° C. Forms of catalytic converter obtained in this way include, for example, unsupported honeycomb catalyst extrudates, coated metal grids or foils, coated inert or refractory ceramic supports.

A 63 liter catalytic converter with an active material which is composed of (% by weight) 75% $TiO_2$, 8% $WO_3$, 3% $V_2O_5$, 8% $SiO_2$, 1.5% $Al_2O_3$, 2% CaO and 0.5% $B_2O_3$ was tested in a diesel engine with a 12 l capacity and 315 KW output. The measurement was carried out on an engine test bed in a test cycle in accordance with ECE-R.49 (13-stage test). The measurements determined that 76% of the nitrogen oxides, 87% of the hydrocarbons and 50% of the particles were converted.

We claim:

1. A method for cleaning diesel engine exhaust gas, which comprises the steps of:

metering a reducing agent capable of reducing nitrogen oxides into an exhaust-gas stream upstream of a catalytic converter; and passing the exhaust gas through the catalytic converter having an active material composed (in % by weight) of:

| | |
|---|---|
| 70–95% | $TiO_2$, |
| 2–10% | at least one of $WO_3$ and $MoO_3$, |
| 0.1–5% | $V_2O_5$, |
| 0.1–8% | CaO, |
| 0.1–8% | $Al_2O_3$, |
| 0.1–5% | $B_2O_3$, and |
| 0.1–10% | $SiO_2$. |

2. The method according to claim 1, wherein the active material has a BET surface area of 40–150 $m^2/g$.

3. The method according to claim 1, wherein the active material has a pore volume measured using a Hg penetration method of 200–600 $mm^3/g$.

4. The method according to claim 1, wherein the active material has a monomodal pore radius distribution, a frequency maxima of a pore radii lying in a range of 5–10,000 nm.

5. The method according to claim 1, wherein the $TiO_2$ is in its anatase modification.

6. The method according to claim 1, wherein the active material has a polymodal pore radius distribution, a frequency maxima of a pore radii lying in a range of 5–10,000 nm.

* * * * *